United States Patent
Kotowski

(10) Patent No.: US 9,572,206 B2
(45) Date of Patent: Feb. 14, 2017

(54) ACTIVE VALLEY FILL POWER FACTOR CORRECTION

(71) Applicant: Atmel Corporation, San Jose, CA (US)

(72) Inventor: Jeff Kotowski, Nevada City, CA (US)

(73) Assignee: Atmel Corporation, San Jose, CA (US)

( * ) Notice: Subject to any disclaimer, the term of this patent is extended or adjusted under 35 U.S.C. 154(b) by 326 days.

(21) Appl. No.: 13/894,362

(22) Filed: May 14, 2013

(65) Prior Publication Data

US 2014/0340943 A1    Nov. 20, 2014

(51) Int. Cl.
| | |
|---|---|
| *H02M 7/217* | (2006.01) |
| *H05B 33/08* | (2006.01) |
| *H02M 3/24* | (2006.01) |
| *H02M 1/42* | (2007.01) |
| *H02M 3/158* | (2006.01) |
| *H02M 3/335* | (2006.01) |

(52) U.S. Cl.
CPC ....... *H05B 33/0815* (2013.01); *H02M 1/4208* (2013.01); *H02M 3/158* (2013.01); *H02M 3/33538* (2013.01); *H02M 1/4266* (2013.01); *Y02B 70/123* (2013.01)

(58) Field of Classification Search
CPC .... H02M 7/2176; H02M 3/24; H02M 1/4208; H02M 3/33538; H02M 3/158; H05B 33/0815; Y02B 70/126

USPC .. 323/284, 285, 224, 288, 242, 326; 363/44, 21.01, 21.04, 21.05, 21.07, 363/21.09–21.11
See application file for complete search history.

(56) References Cited

U.S. PATENT DOCUMENTS

| | | | | |
|---|---|---|---|---|
| 5,698,952 | A   * | 12/1997 | Stebbins | 315/307 |
| 6,069,800 | A   * | 5/2000  | Cross | H02M 1/4258 363/20 |
| 6,784,622 | B2  * | 8/2004  | Newman et al. | 315/219 |
| 2002/0071300 | A1 * | 6/2002 | Jang | H02J 7/345 363/125 |
| 2003/0103362 | A1 * | 6/2003 | Gan | H02M 3/33538 363/25 |
| 2007/0263417 | A1 * | 11/2007 | Lin et al. | 363/21.12 |
| 2010/0014330 | A1 * | 1/2010 | Chang | H02M 1/4225 363/89 |
| 2013/0128641 | A1 * | 5/2013 | Higashihama | H05B 33/0815 363/126 |
| 2013/0343095 | A1 * | 12/2013 | Zhu et al. | 363/21.01 |

* cited by examiner

*Primary Examiner* — Gustavo Rosario Benitez
(74) *Attorney, Agent, or Firm* — Fish & Richardson P.C.

(57) ABSTRACT

A power converter is disclosed that includes an active valley fill (AVF) capacitor that is actively switched to provide current to a load during a portion of an alternating current (AC) input cycle. The current supplied to the load includes some current supplied by the AC input and some current supplied by the AVF capacitor. Circuitry is configured to regulate the amount of current flowing through the load, including controlling the amount of current supplied by the AVF capacitor. The duty cycle on the AVF capacitor can be adjusted to shape the AC input current waveform.

20 Claims, 11 Drawing Sheets

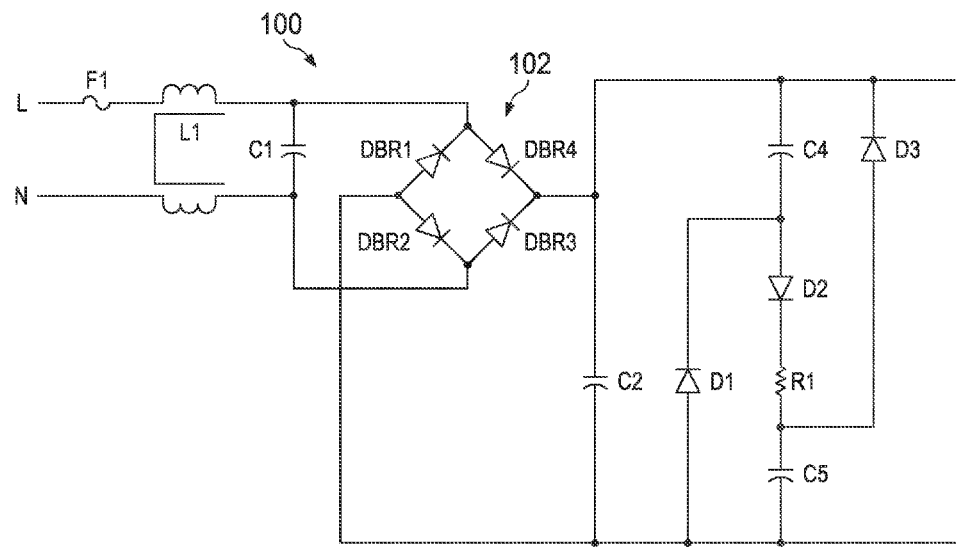
FIG. 1    --Prior Art--
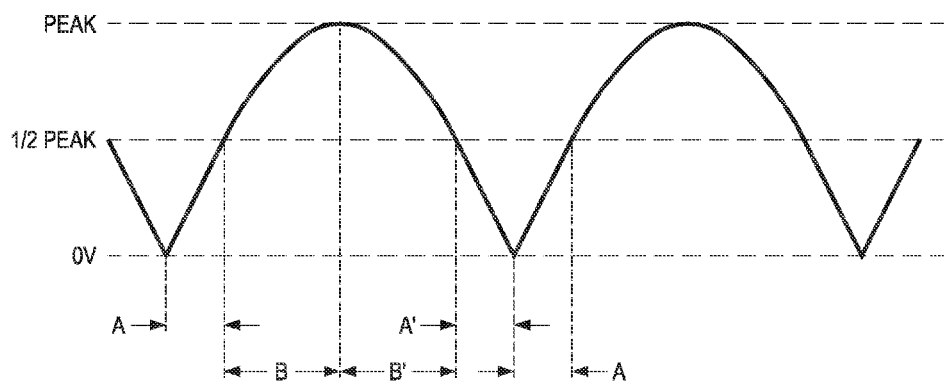
FIG. 2    --Prior Art--

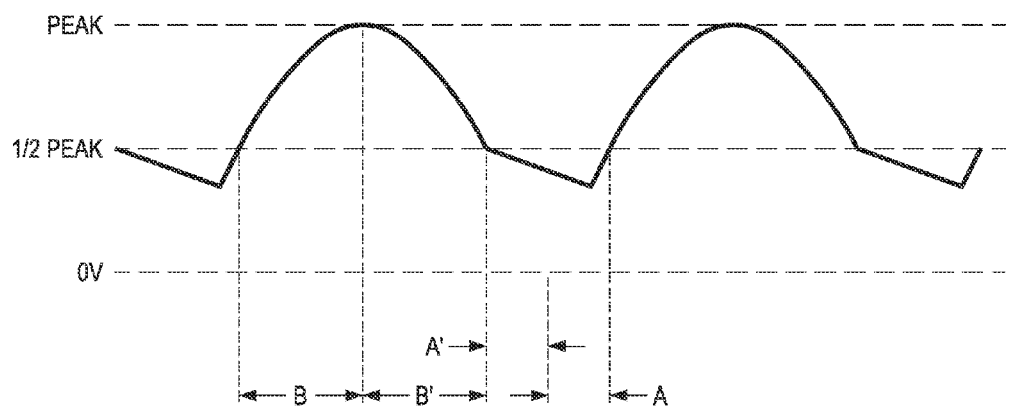
FIG. 3 --Prior Art--
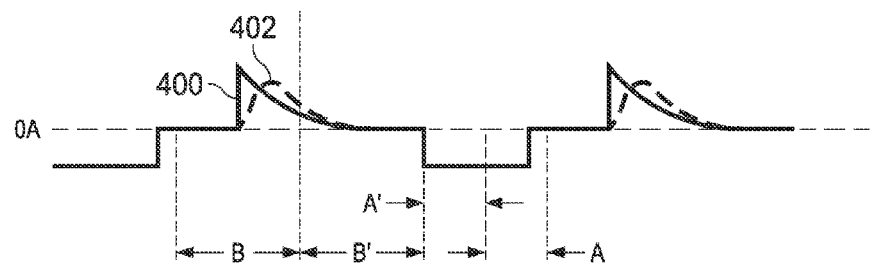
FIG. 4 --Prior Art--
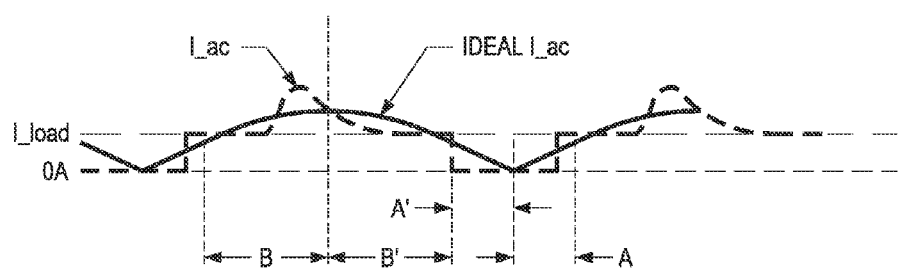
FIG. 5 --Prior Art--

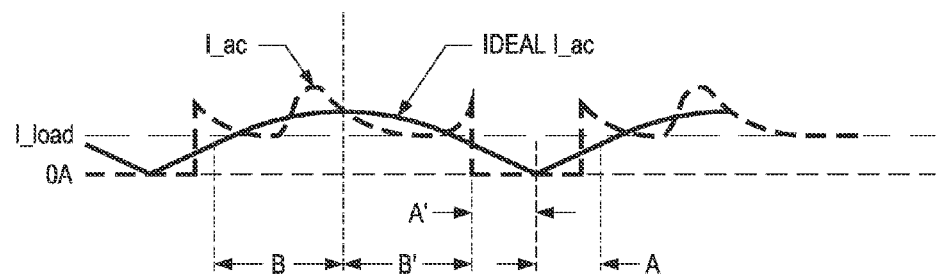
FIG. 6  --Prior Art--
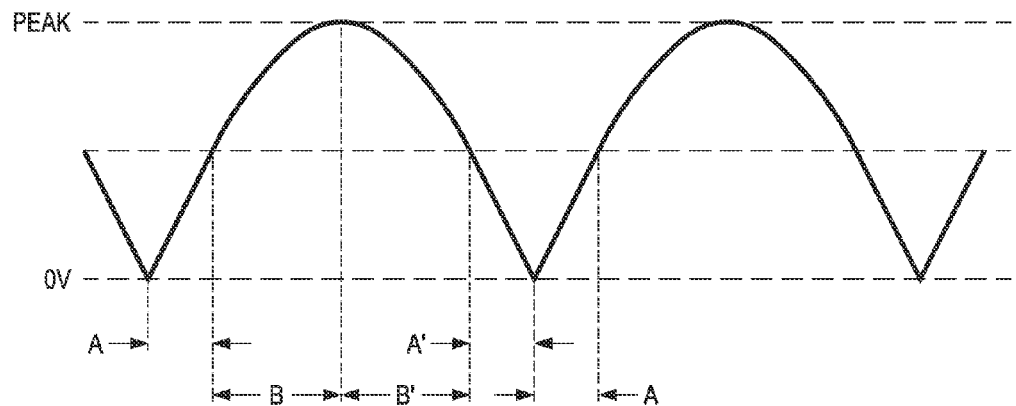
FIG. 7A  --Prior Art--
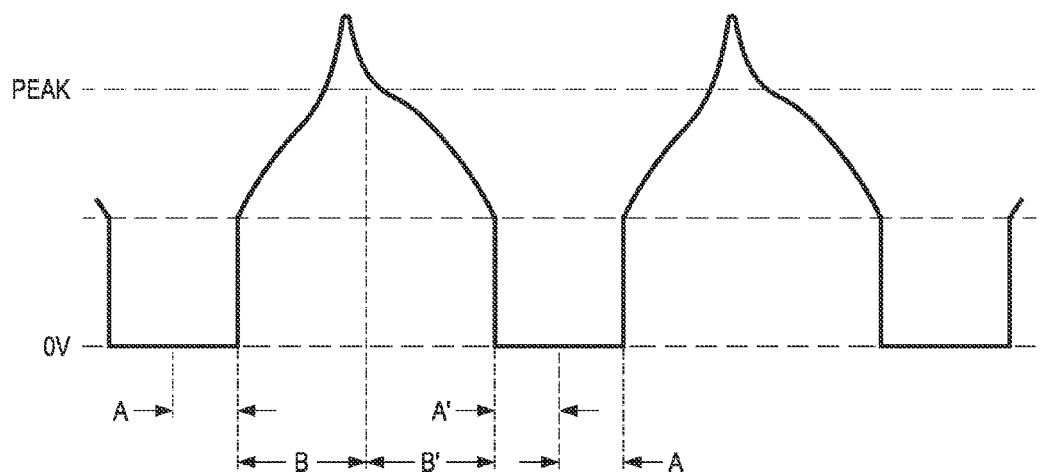
FIG. 7B  --Prior Art--

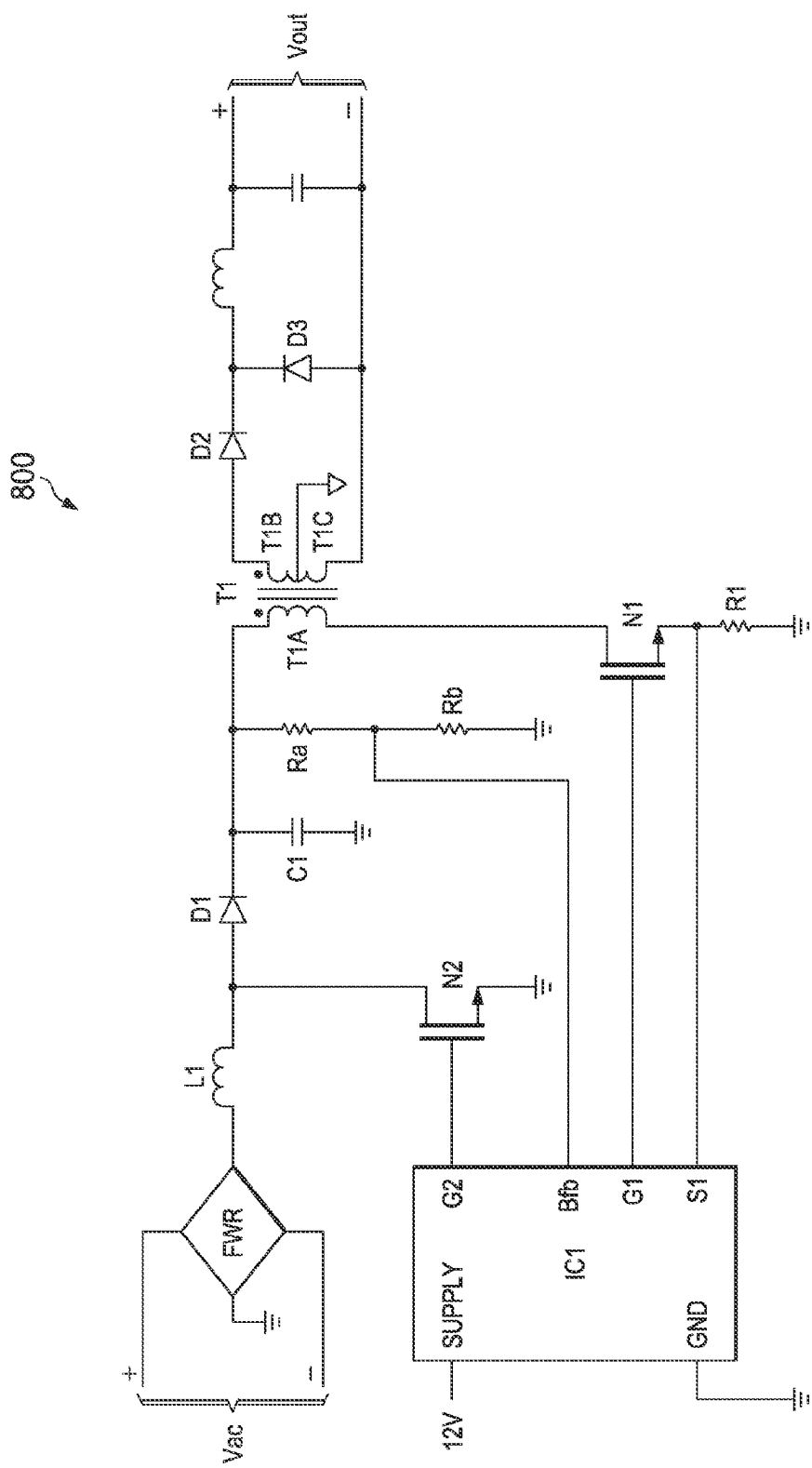
FIG. 8 --Prior Art--

ACTIVE VALLEY FILL POWER FACTOR CORRECTION

TECHNICAL FIELD

This disclosure relates generally to alternating current (AC) powered systems that drive direct current (DC) loads or require a DC supply.

BACKGROUND

FIG. 1 is a schematic diagram of a voltage halving passive valley fill (PVF) circuit 100. PVF circuit 100 includes a full wave rectifier (FWR) 102 (e.g., diodes DBR1-DBR4), diodes D1-D3, fill capacitors C2, C4, C5 and resistor R1. In AC powered systems that drive DC loads or require DC supply, PVF circuit 100 can provide power to a load when the rectified AC input voltage approaches zero. PVF capacitors C2, C4, C5 are charged in series and discharged in parallel due to diodes D1-D3. During discharge, the fill capacitors provide half of the peak AC input voltage to the load.

FIG. 2 is a plot illustrating the rectified AC input voltage, which is output from FWR 102. Each cycle of the rectified AC input voltage is twice the frequency of the AC input voltage. Each cycle of the rectified AC input voltage arbitrarily starts at the beginning of time period A and ends at the end of time period A'. For discussion purposes, a cycle of the rectified AC input voltage is assumed to start at the beginning of time period B and end at the end of the next time period A.

FIG. 3 is a plot of output voltage of PVF circuit 100. PVF capacitors C2, C4, C5 charge to the peak input voltage. Because of diodes DBR1-DBR4 in FWR 102, when the rectified AC input voltage falls below one half of the peak voltage, the combined voltage on PVF capacitors C2, C4, C5, is larger than the AC input voltage and PVF capacitors C2, C4, C5 supply current to the load. The combined voltage of PVF capacitors C2, C4, C5 falls as the load draws current. Thus, the rectified AC input voltage surpasses the combined voltage on PVF capacitors C2, C4, C5 before the end of time period A.

FIG. 4 is a plot of PVF capacitor current. The current in PVF capacitors C2, C4, C5 is shown in FIG. 4. Line 402 illustrates the resistor limiting the inrush current into PVF capacitors C2, C4, C5 and line 400 illustrates a low resistor value R. During time period A, and most of time period A', PVF capacitors C2, C4, C5 supply current to the load. During the end of time periods A, B and B', the AC input supplies current to the load and current to charge PVF capacitors C2, C4, C5. Because PVF capacitors C2, C4, C5 are coupled in series when charging the recharge of PVF capacitors C2, C5, C5 occurs when the rectified AC input voltage is near, but prior to, the peak AC input voltage. Because PVF capacitors C2, C4, C5 are coupled in parallel during discharge, PVF capacitors C2, C4, C5 supply current to the load when the rectified AC input voltage falls below half of peak AC input voltage.

The current from the AC input is the sum of the current supplied to the load during time periods B and B' plus the current to charge PVF capacitors C2, C4, C5. For approximately one third of the cycle of the AC input voltage (A and most of A'), the AC input sees no load and the load at the output is supplied by PVF capacitors C2, C4, C5.

FIG. 5 is a plot of actual AC current (I_ac) versus ideal AC current. For the DC current load (I_load), the actual AC current is a rather rough approximation of the ideal AC current, where "ideal" means having a higher power factor near 1.0. This is for a constant current load, meaning the output power is not constant. For a constant load power, the I_load becomes much worse (worse PF) because the current must increase near the valley to compensate for the decreasing supply voltage, as shown in FIG. 6.

FIGS. 7A and 7B are plots illustrating an input voltage waveform of PVF circuit 100 with a resistive load and resistor current limiting. One can observe from FIGS. 7A and 7B, that PVF circuit 100 is limited in its ability to provide a good power factor. The current from the AC input is zero when PVF capacitors C2, C4, C5 are conducting. Although the shape of the PVF voltage and current waveforms look better with a resistive load, there is no current drawn from the resistive load for roughly one third of the cycle and there is a current spike near the middle of the cycle to charge the PVF capacitors.

FIG. 8 is a schematic diagram of a two-stage power factor correction (PFC) converter 200. Two-stage converter 800 is a conventional solution to the power factor problem described above. First stage 802 of converter 800 includes inductor L1, diode D1, capacitor C1, resistors Ra, Rb, transistor N2 and integrated circuit IC1. Second stage 804 includes the remaining components in FIG. 8 in conjunction with IC1. The power factor correction provided by two-stage converter 800 is good but the extra inductor L1 and the associated losses and costs are not desired.

SUMMARY

A power converter is disclosed that includes an active valley fill (AVF) capacitor that is actively switched to provide current to a load during a portion of an AC input cycle. The current supplied to the load includes some current supplied by the AC input and some current supplied by the AVF capacitor. Circuitry is configured to regulate the amount of current flowing through the load, including controlling the amount of current supplied by the AVF capacitor. The duty cycle on the AVF capacitor can be adjusted to shape the AC input current waveform. The AVF capacitor can be combined with a floating buck converter for powering the load. The AVF can be used in non-isolated and isolated PFC converter topologies. The isolated topologies can use a winding of an isolation transformer to transfer voltage from the AVF capacitor to the load. The isolated topologies can include an open or closed loop to the secondary side of the transformer. Circuitry can be included on the secondary side of the transformer to rectify the AVF capacitor voltage due to reverse polarity of the winding used to transfer the AVF capacitor voltage to the load.

In some implementations, a power converter includes a rectifier configured for coupling to an AC input. An AVF capacitor is coupled to an output of the rectifier through a first switch. The first switch is configurable to enable flow of current from the AVF capacitor. An energy storage circuit is coupled to the AVF capacitor and to the output of the rectifier through a second switch. The second switch is configurable to regulate current in the energy storage circuit. A control circuit is coupled to the first switch and the second switch. The control circuit is configurable to control duty cycles of the first and second switches concurrently during a portion of a cycle of the AC input to supply current from the AVF capacitor and AC input to the energy storage circuit.

In some implementations, a method performed by a power converter comprises: receiving an AC input; rectifying the AC input; configuring a first switch coupled to an AVF capacitor to enable a flow of current from the AVF capacitor; configuring a second switch to regulate current flow in an energy storage circuit; and configuring a control circuit coupled to the first switch and the second switch to control duty cycles of the first and second switches concurrently during a portion of a cycle of the AC input voltage to supply current from the AVF capacitor and AC input to the energy storage circuit.

Particular implementations disclosed herein provide one or more of the following advantages: 1) input capacitors are maintained on the input side of a power converter, where they can be smaller in high voltage systems, and to which a fast DC-DC converter without bandwidth limitations of conventional active PFC converters can be coupled; 2) improved current shaping that satisfies regulatory harmonic current requirements; 3) significantly lowered part count and system cost of implementing solutions; 4) improved efficiency; and 5) decreased physical area requirements for implementing solutions.

BRIEF DESCRIPTION OF THE DRAWINGS

FIG. 1 is a schematic diagram of a voltage halving PVF

FIG. 2 is a plot illustrating an FWR AC input waveform.

FIG. 3 is a plot of PVF voltage.

FIG. 4 is a plot of PVF capacitor current.

FIG. 5 is a plot of actual AC current versus ideal AC current.

FIG. 6 is a plot of supply current for a constant power load.

FIGS. 7A and 7B are plots illustrating a resistive load on a PVF circuit with resistor current limiting.

FIG. 8 is a schematic diagram of a two-stage PFC converter.

DETAILED DESCRIPTION

Figure 9A:
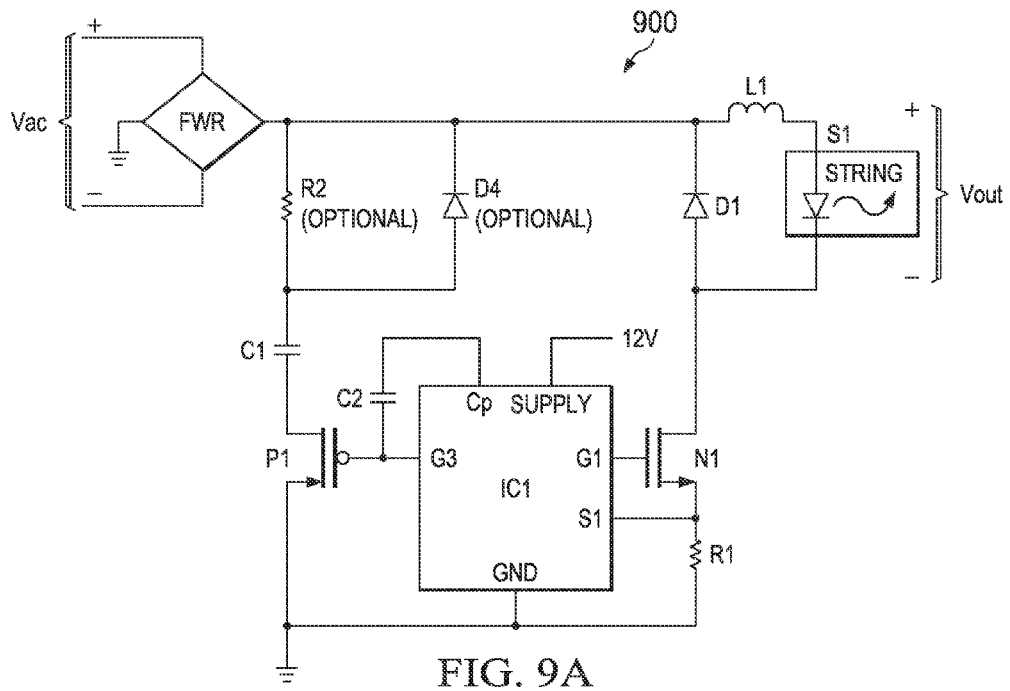
FIGS. 9A and 9B are schematic diagrams of an exemplary primary side active AVF circuit.

FIG. 9A is a schematic diagram of an exemplary primary side AVF circuit 900 for a primary side Light Emitting Diode (LED) application. While the circuit configuration shown is for an LED application, circuit 900 may be used with other types of applications.

In the example shown, circuit 900 is a floating buck converter that includes FWR, resistors R1, R2, diode D4, capacitors C1, C2 transistors P1, N1, integrated circuit IC1, load S1 and an energy storage circuit including diode D1 and inductor L1. When switch N1 (e.g., NMOS transistor) is driven closed, the current in circuit 900 begins to increase and L1 drops a voltage. The voltage drop across L1 counteracts the input voltage and reduces the net voltage across load S1, which in this example is an LED string. Over time, L1 allows the current in circuit 900 to increase slowly by decreasing the voltage it drops and therefore increasing the net voltage seen by S1. During this time, L1 is storing energy in the form of a magnetic field. If N1 is driven open before L1 has fully charged, then there will always be a voltage drop across L1, such that the net voltage seen by S1 will always be less than the input voltage source. When N1 is driven open again, the load from the string S1 will not flow through the input voltage Vac, the current will begin to drop, causing L1 to reverse the direction of its voltage and to act like a voltage source. If N1 is driven closed again before L1 fully discharges, S1 will always see a non-zero voltage.

AVF capacitor C1 placed in parallel with S1 helps to smooth out the voltage waveform as L1 charges and discharges in each cycle. R2 is an optional resistor to limit inrush current when C1 is being charged. D4 is also optional and allows R2 to be bypassed when the charge from C1 is being delivered to the load. The gate G1 of N1 is driven by IC1 based on the current through S1.

Figure 9B:
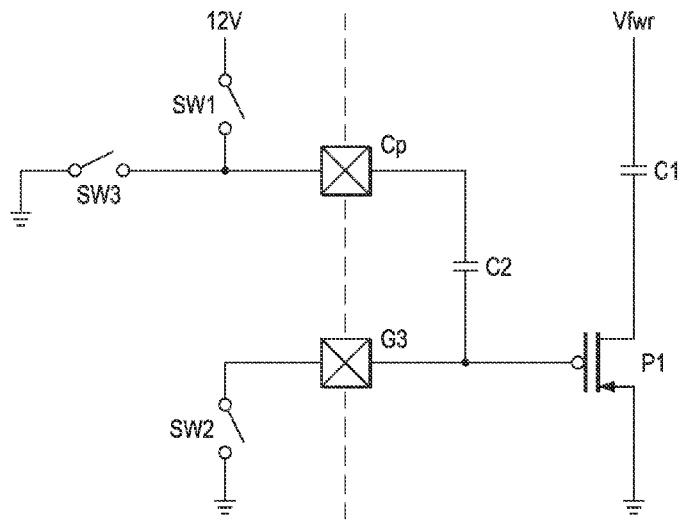

FIG. 9B is a schematic diagram illustrating the operation of circuit 900. Switch P1 (e.g., PMOS transistor) controls the discharge of AVF capacitor C1. Because of the parasitic diode (source to drain) inherent in P1, C1 will charge independent of the voltage on the gate G3 of P1. In the discharge phase (when C1 supplies current to the load) the drain of P1 will fall below ground and will remain off until G3 is driven (at least a threshold voltage) below ground. This is the purpose of C2 and the switches sw1, sw2 and sw3. When P1 is desired off, sw2 and sw1 are driven closed and sw3 is driven open. This switch configuration drives G3 to zero volts, turning off P1, and charges C2 to the supply voltage (e.g., 12 volts). When P1 is desired to be on, sw1 and sw2 are driven open and sw3 is driven closed. This switch configuration drives G3 to approximately a negative supply voltage (e.g., −12V), turning P1 on.

When P1 is off, the FWR voltage is seen at Vfwr. When P1 is on, the voltage on C1 is seen at Vfwr. In this manner, circuit 900 can switch between the full-rectified voltage and the voltage on C1 at any desired time. Circuit 900 is not limited to half the peak voltage as in PVF circuit 100. In fact, AVF circuit 900 allows for switching back and forth between the FWR voltage and the voltage on C1 at any time.

Figure 10A:
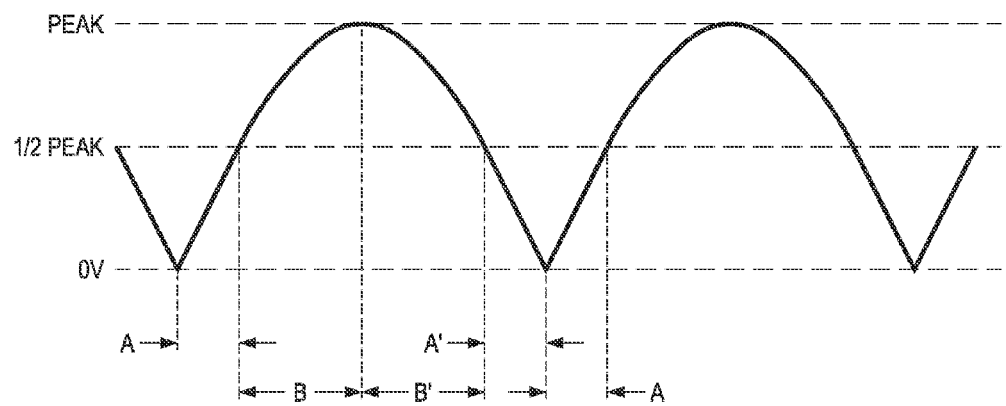
FIGS. 10A through 10C are plots illustrating AVF voltage waveforms.
Figure 10B:
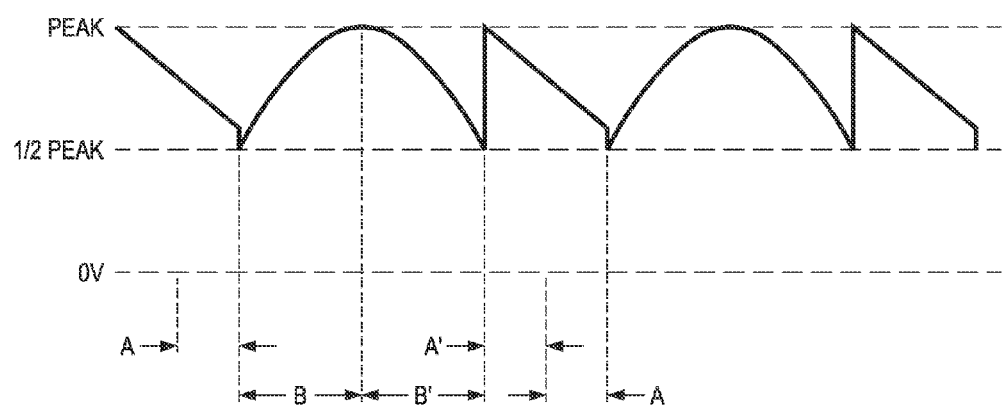

FIG. 10A illustrates a full wave rectified waveform. To aid the comparison of AVF with PVF, the A' and A part of the cycle will be examined. With AVF, the AVF capacitor C1 may be engaged at any time. For example, P1 may be turned on before A' starts or well after A' starts. Thus, the time for which the AC input current is drawn can be shortened or lengthened. In FIG. 10B, capacitor C1 is switched in for the entire A' and A interval.

Figure 10C:
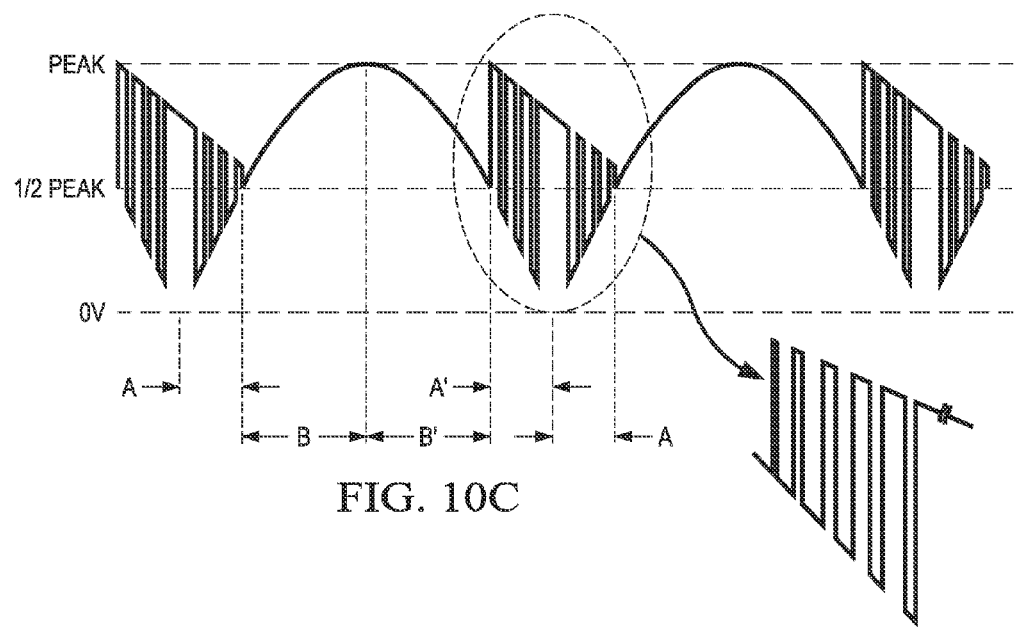

FIG. 10C illustrates the full wave rectified waveform with switching between the voltage on AVF capacitor C1 and the rectified AC input voltage. The time duration is not representative of the actual time or duty cycle but is shown for illustrative purposes. The advantage of AVF circuit 900 is that current is drawn from the AC input during time A' and A when both capacitor C1 and the AC input are supplying current to the load concurrently. If the switching is fast enough, the AC input sees the average current drawn during A' and A. The circuit can switch back to the AC input for a short amount of time such that the average current follows the AC input waveform. The current drawn by the load can be decreased to zero as the AC input voltage decreases and increased as the AC input voltage increases.

Referring to FIG. 10C and FIG. 9A, the capacitor C1 provides current to the load (Vout) during time period A and A', and the input voltage provides power to the load during time periods B, B', A and A'. Table I below illustrates how the AC input voltage and AVF capacitor provide current to the load during the time periods B, B', A and A'.

TABLE I

Load Current Contributions During AC Input Cycle

| Time Period | AC Input | Capacitor C1 |
|---|---|---|
| B | Sole supplier of current to the load | No current supplied to load (C1 charging) |
| B' | Sole supplier of current to the load | Idle |
| A' | Supplies some current to the load | Supplies some current to the load |
| A | Supplies some current to the load | Supplies some current to the load |

During time period B, the input voltage supplies power to the load and charges up C1. During time B', C1 is charged and is idle. The input voltage supplies power to the load. During time A and A', both the input and C1 provide power to the load. When input voltage is high (near the start of time period A'), most of the current in the load is supplied by the input and a small amount of current is supplied by C1. Consequently, the duty cycle (on time) of switch P1 is small. When the voltage is low (near the end of time period A' and the beginning of time period A), most of the current is supplied by C1 and a small amount of current is supplied by the input. Consequently, the duty cycle on P1 is high. Effectively, the duty cycle on C1 increases as the voltage from the input falls and is thus inversely proportional to the FWR voltage. A blowup of time period A' in FIG. 10C illustrates the duty cycle on C1 starting low and getting higher (on time is increasing) as the FWR voltage decreases.

Referring to FIG. 9A, D1, L1 and S1 are the primary components of the floating buck converter. N1, R1 and IC1 regulate the current in the floating buck converter. The effect is to create a controlled current in L1 such that the current in the load S1 is controlled. The floating buck converter requires a minimum voltage that is greater than the output voltage (Vout) to maintain Vout. Even so, current can still be drawn from the AC input when the AC input falls below this minimum voltage. In this case, instead of adding current to L1, the rate at which L1 current falls is decreased and current is drawn from the AC input as desired to create good PFC.

In operation, the L1 current in the floating buck converter increases when N1 is on and the supply voltage is greater than the Vout. The inductor current decreases when N1 is off. When the FWR voltage is below Vout, if the AC input voltage is switched from the voltage across C1 to the FWR voltage there is no change of behavior when N1 is off (the current decreases). However, when N1 is on, the L1 current will still decrease but at a slower rate because the voltage V across L1 is less and the change in current over time is less (V=L di/dt). As long as C1 is switched back (by IC 1 through switch P1) to maintain the desired L1 current, the FWR voltage can be switched into the load by IC1 through switch N1 to draw current.

Setting Duty Cycle on Switch P1

The circuit configuration that is shown in FIG. 9A uses a floating buck topology to regulate the output voltage (Vout). The duty cycle of switch N1 increases as the FWR voltage drops and will reach 100% when the FWR voltage is approximately equivalent to Vout. This is the point where AVF capacitor C1 is used to deliver some of the current to the load. Once the 100% duty cycle is achieved, switch N1 stays on. Resistor R1 is used to monitor the current through the floating buck. The circuit configuration is effectively a floating buck converter that switches between two voltages: the voltage on C1 and the FWR voltage. The switching can be controlled by the duty cycle of switch P1. For example, the gate G3 of transistor P1 can be driven negative by IC1 to turn P1 on.

In some implementations, it may be desirable to slow or smooth the transition from a floating buck to a conventional buck. This could have the benefit of wave shaping for better power factor correction. For example, the circuit can start switching C1 at a low duty cycle half way through the time period B'. During the transition phase (before N1 duty cycle reaches 100%), the circuit can start switching C1. The FWR current waveform can be shaped based on when and how the current from C1 is supplied to the load.

In some implementations, a comparator (not shown) can be added to the circuit in FIG. 9A that takes as inputs the FWR voltage and Vout. When the input voltage is less than Vout, the comparator outputs a voltage that can be used as a signal to reconfigure the floating buck converter to a conventional buck converter.

Figure 11A:
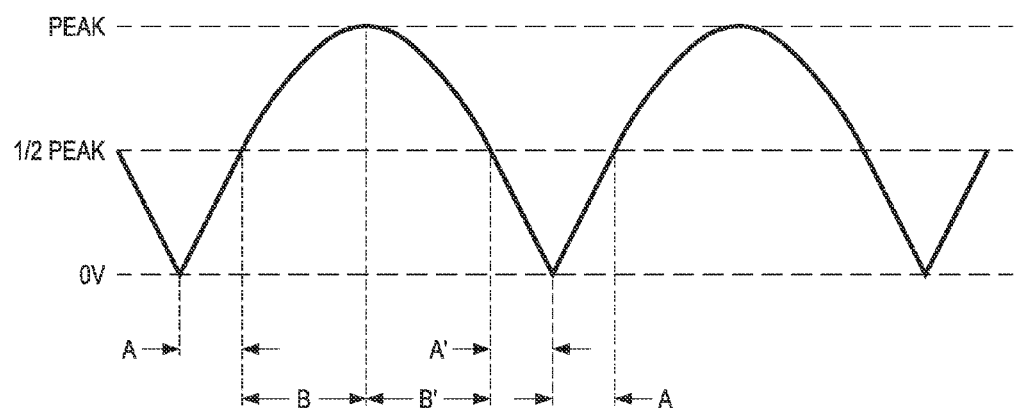
FIGS. 11A through 11C are plots of PVF versus AVF currents.
Figure 11B:
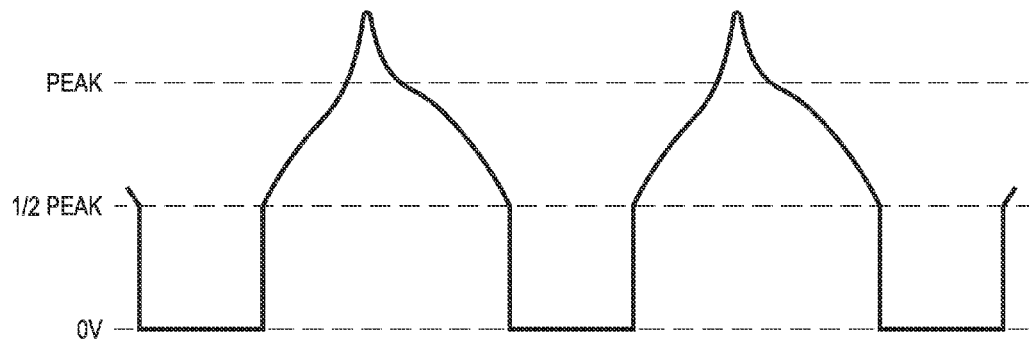
Figure 11C:
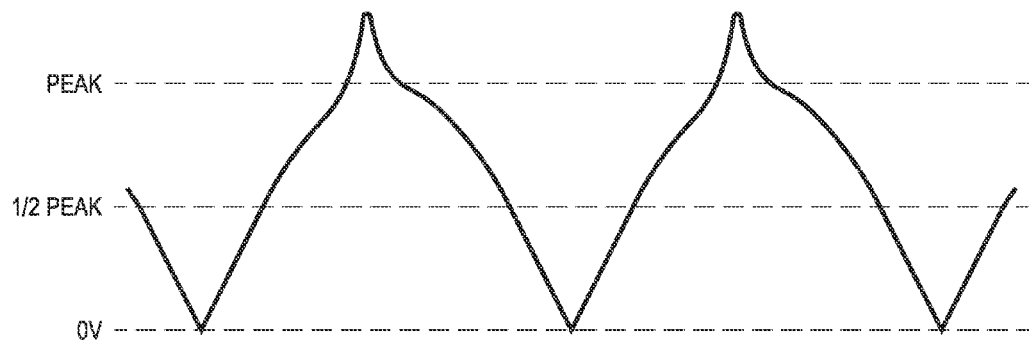

FIGS. 11A through 11C are plots of PVF versus AVF currents. Comparing the current in PVF (for a resistive load) and AVF, the power factor of AVF is significantly improved. AVF provides better power delivery (smaller capacitor C1, higher voltage on C1) and better power factor. Compared to a two-stage converter Shown in FIG. 8, AVF gets nearly as good a power factor (AVF still has the capacitor charging current) and nearly as good a power delivery (two-stage converter places a slightly higher voltage on the capacitor). Finally, AVF eliminates the inductive losses (e.g., magnetic losses and resistive losses) due to the inductor used in the two-stage converter.

Example AVF Circuit Topologies with Isolated Loads

AVF can be used in isolated or non-isolated designs as shown in FIGS. 12-15. These example topologies each include a forward FWR; however, other known isolated designs are applicable. Additionally, each circuit includes an open loop to the secondary side. In some implementations, however, feedback may also be used. For example, an opto-isolator or other means can be used to provide feedback on the secondary side of the transformer.

Figure 12:
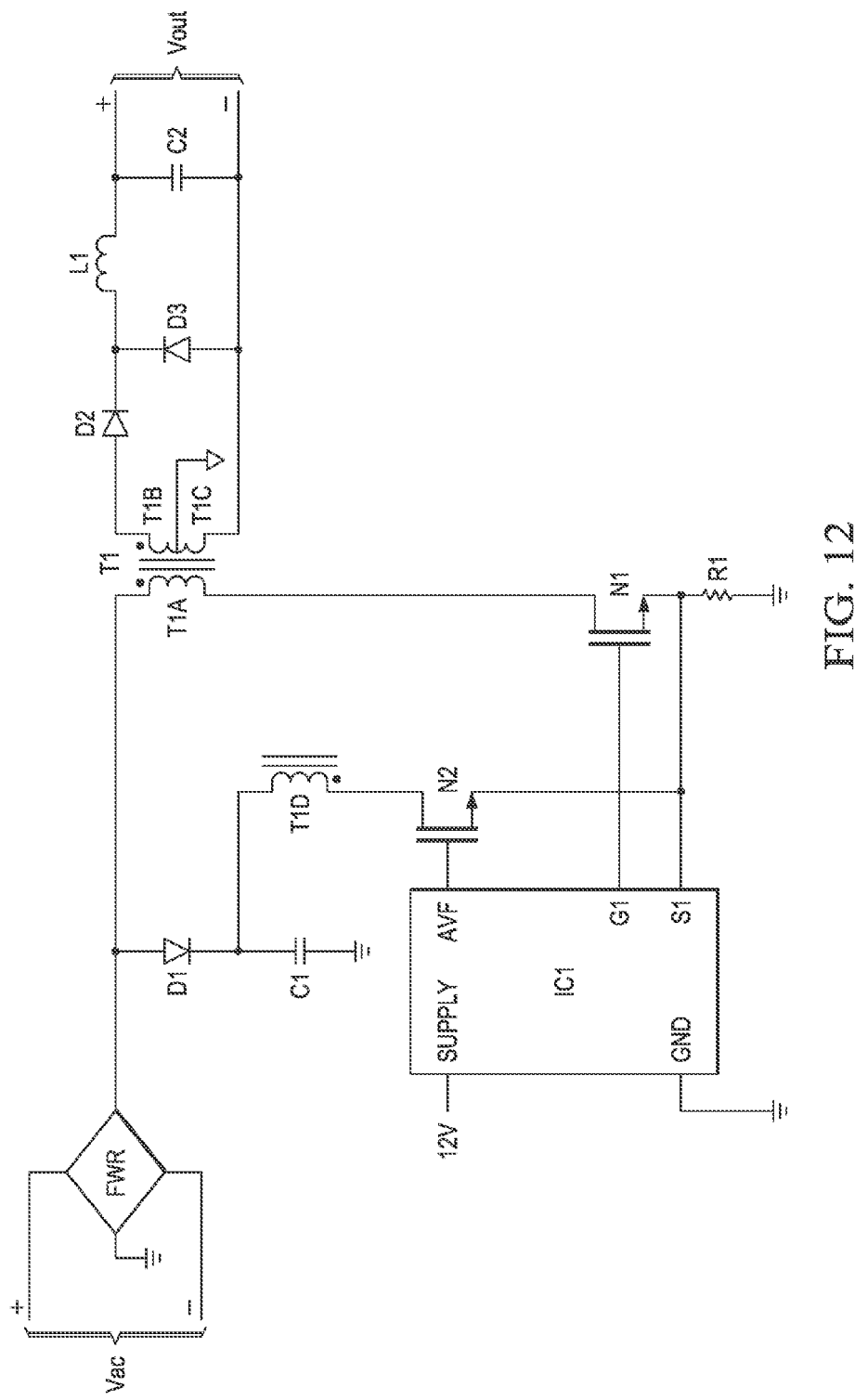
FIG. 12 is a schematic diagram of an exemplary AVF circuit with center tap transformer.

FIG. 12 is a schematic diagram of an exemplary AVF circuit with a center tap transformer T1 having four windings T1A-T1D. AVF is accomplished using winding T1D to transfer the voltage from AVF capacitor C1 to the load. Diode D1 allows capacitor C1 to charge to the peak voltage of the FWR input. An optional inrush current limiting resistor (not shown) can be placed in series with D1. This configuration acts as a forward converter that transfers energy to the secondary from either the AVF voltage on C1 or the FWR input. The FWR input energy is transferred in a forward converter manner, by turning on switch N1. This forward biases diode D2 and allows energy to pass to inductor L1 and capacitor C2. When switch N2 is turned on, energy is transferred through diode D3. Since switches N2, N1 are not on at the same time, the sense resistor R1 can be shared by switches N2, N1. Diodes D2 and D3 rectify the input.

Figure 13:
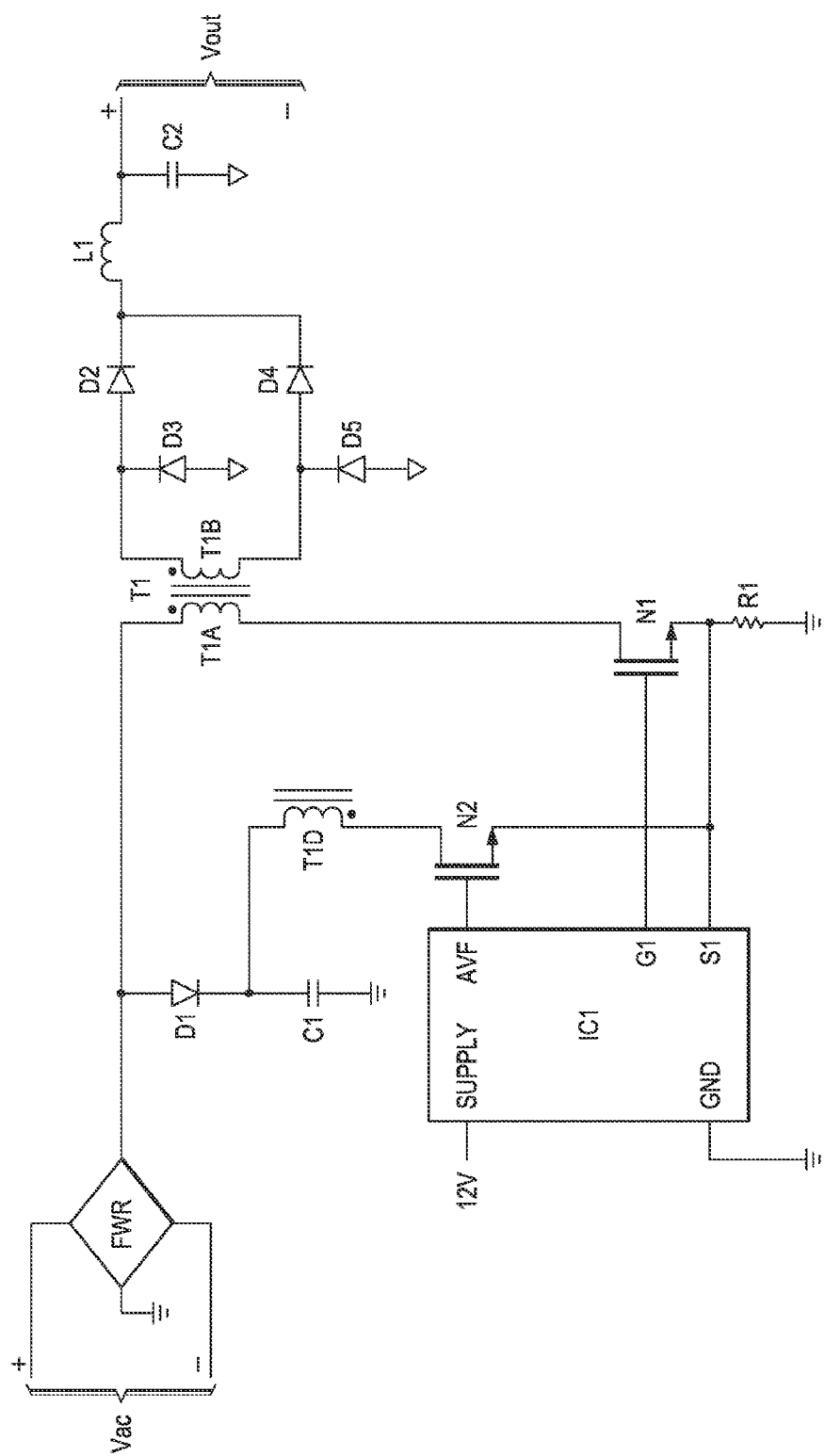
FIG. 13 is a schematic diagram of an exemplary AVF circuit with secondary FWR.

FIG. 13 is a schematic diagram of an exemplary AVF circuit including a secondary FWR. The AVF circuit is equivalent in function to the AVF circuit in FIG. 12 but includes a secondary FWR comprising diodes D3, D5 on each side of the secondary winding T1B to rectify the FWR input. In this topology, the transformer T1 does not require a center tap. In FIGS. 12 and 13, the polarity of coil T1D of the transformer T1 is reversed. This guarantees that the voltage on the drain of switch N2 is positive. As a consequence, the voltage from the AVF capacitor C1 is inverted, which accounts for the need to rectify in the AVF circuits of FIGS. 12 and 13.

Figure 14:
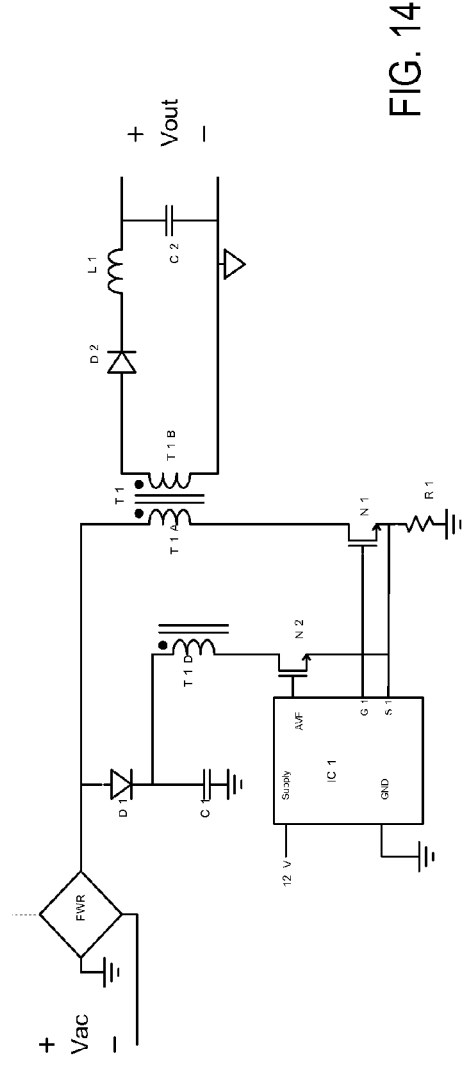
FIG. 14 is a schematic diagram of an exemplary simplified AVF circuit.

FIG. 14 is a schematic diagram of an exemplary simplified AVF circuit. The circuit in FIG. 14 is simplified further from the circuits shown in FIGS. 12 and 13 by including only a single diode D2 on the secondary side of transformer T1. D2 can be used if the turn ratio of coils T1A and T1D is at or near one. It is important to keep the parasitic diode in N2 from turning on. Other than when C1 is charging, the voltage on C1 is always greater than the voltage on Vfwr. If the turn ratio is one or less then turning on transistor N1 will maintain a positive voltage on the drain of N2 and the parasitic diode of N2 will remain off. The circuits in FIGS. 12 and 13 do not have the turn ratio requirement because of the polarity of the T1D winding.

Figure 15:
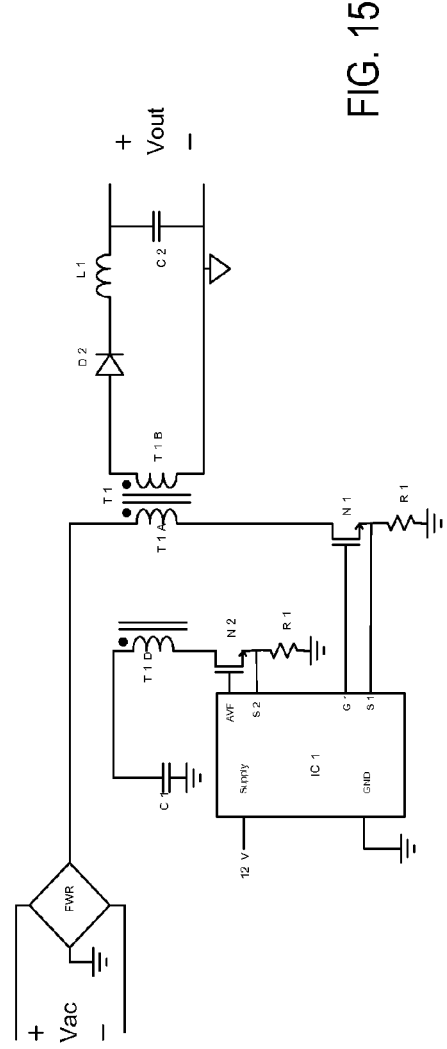
FIG. 15 is a schematic diagram of an exemplary charge and discharge AVF circuit.

FIG. 15 is a schematic diagram of an exemplary charge and discharge AVF circuit. This topology uses coil T1D to charge the AVF capacitor C1. Diode D1 is eliminated and the current that is sensed at s1 (the voltage across R1) represents the total load on the AC input.

The isolated AVF circuits shown in FIGS. 12-15 have the advantage of using only NMOS transistors N1, N2 for switches and requiring only a positive voltage to turn on the NMOS transistors N1 and N2. Additionally, each of these circuits assumes a positive FWR. In some implementations, a negative FWR could be used by reversing the diodes in the FWR and replacing the NMOS transistors with PMOS transistors and vice-versa.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A power converter comprising:
   a rectifier configured to couple to an alternative current (AC) input voltage;
   an active valley fill (AVF) capacitor coupled to an output of the rectifier and a first switch, the first switch configurable by a control circuit for enabling a flow of current from the AVF capacitor;
   an energy storage circuit coupled to the AVF capacitor, to the output of the rectifier and to a second switch, the second switch configurable for regulating current in the energy storage circuit; and
   the control circuit coupled to the first switch and the second switch, the control circuit configured to control duty cycles of the first switch and the second switch concurrently during a portion of a cycle of the AC input voltage to supply current from the AVF capacitor and the AC input voltage to the energy storage circuit, where the control circuit is configured to increase a duty cycle associated with at least one of the first switch or the second switch based on current supplied by the AVF capacitor as the AC input voltage decreases, wherein the duty cycle associated with at least one of the first switch or the second switch controls current pulses provided to the energy storage circuit based on the AC input voltage and the AVF capacitor.

2. The power converter of claim 1, where the energy storage circuit comprises:
   an inductor coupled to the AVF capacitor; and
   a diode coupled to the inductor and the second switch.

3. The power converter of claim 1, further comprising:
   a resistor coupled to the second switch and the control circuit, where the control circuit is configured to sense a current through the resistor and to use the sensed current to adjust the duty cycles of the first or second switch.

4. The power converter of claim 1, where the energy storage circuit is isolated from the rectifier by a transformer.

5. The power converter of claim 4, where a winding of the transformer is coupled to the AVF capacitor.

6. The power converter of claim 5, where the energy storage circuit is on a secondary side of the transformer and includes one or more components for rectifying the AVF capacitor voltage transferred through the winding.

7. The power converter of claim 1, further comprising:
   a resistor coupled to the AVF capacitor and the output of the rectifier; and
   a diode coupled in parallel to the resistor,
   wherein the energy storage circuit is coupled to the AVF capacitor and to the output of the rectifier through at least one of the resistor and the diode.

8. The power converter of claim 1, further comprising:
   a second capacitor coupled to the control circuit and the first switch.

9. The power converter of claim 1, where the control circuit is an integrated circuit.

10. The power converter of claim 1, where the energy storage circuit is coupled to a Light Emitting Diode (LED) string.

11. A power converter comprising:
    a full wave rectifier;
    an active valley fill (AVF) capacitor coupled to an output of the full wave rectifier;
    a first switch coupled to the AVF capacitor;
    a diode coupled to the output of the full wave rectifier;
    an inductor coupled to the output of the full wave rectifier and the diode;
    a second switch coupled to the diode; and
    a control circuit coupled to the first switch and the second switch and configured to control duty cycles of the first switch and the second switch concurrently during a portion of a cycle of an alternating current (AC) input voltage to supply current from the AVF capacitor and the AC input voltage to the output of the full wave rectifier, wherein the control circuit is configured to increase a duty cycle associated with at least one of the first switch or the second switch based on current supplied by the AVF capacitor as the alternating current (AC) input voltage decreases, wherein the duty cycle associated with at least one of the first switch or the second switch controls current pulses generated at the output of the full wave rectifier based on the AC input voltage and the AVF capacitor.

12. The power converter of claim 11, further comprising:

a resistor coupled to the second switch and the control circuit, where the control circuit is configured to sense a current through the resistor and to use the sensed current to adjust the duty cycles of the first switch and second switch.

13. The power converter of claim 11, where the inductor is isolated from the rectifier by a transformer.

14. The power converter of claim 13, where a winding of the transformer is coupled to the AVF capacitor.

15. The power converter of claim 14, where the inductor is on a secondary side of the transformer and includes one or more components for rectifying the AVF capacitor voltage transferred through the winding.

16. The power converter of claim 11, further comprising:
a second capacitor coupled to the control circuit and the first switch.

17. The power converter of claim 11, where the control circuit is an integrated circuit.

18. A method performed by a power converter, comprising:
receiving an alternating current (AC) input voltage;
rectifying the AC input voltage;
configuring a first switch coupled to an active valley fill (AVF) capacitor to enable a flow of current from the AVF capacitor;
configuring a second switch to regulate current flow in an energy storage circuit; and
configuring a control circuit coupled to the first switch and the second switch to control duty cycles of the first switch and the second switch concurrently during a portion of a cycle of the AC input voltage to supply current from the AVF capacitor and the AC input voltage to the energy storage circuit, wherein the control circuit is configured to increase a duty cycle associated with at least one of the first switch or the second switch based on current supplied by the AVF capacitor as the AC input voltage decreases, wherein the duty cycle associated with at least one of the first switch or the second switch controls current pulses provided to the energy storage circuit based on the AC input voltage and the AVF capacitor.

19. The method of claim 18, further comprising:
sensing current in the energy storage circuit; and
configuring the control circuit to adjust the duty cycles of the first switch or the second switch based on the sensed current.

20. The power converter of claim 11, where the full wave rectifier is configured to rectify the AC input voltage, and where during the portion of the cycle, a first current is supplied to the inductor from the rectified AC input voltage and concurrently a second current is supplied to the inductor from the AVF capacitor.

* * * * *

UNITED STATES PATENT AND TRADEMARK OFFICE
CERTIFICATE OF CORRECTION

PATENT NO.         : 9,572,206 B2
APPLICATION NO.    : 13/894362
DATED              : February 14, 2017
INVENTOR(S)        : Jeffrey P. Kotowski Page 1 of 1

It is certified that error appears in the above-identified patent and that said Letters Patent is hereby corrected as shown below:

In the Claims

In Column 9 Line 5 Claim 12, before "second" insert --the--.

Signed and Sealed this
Eleventh Day of April, 2017

Michelle K. Lee
*Director of the United States Patent and Trademark Office*